UNITED STATES PATENT OFFICE.

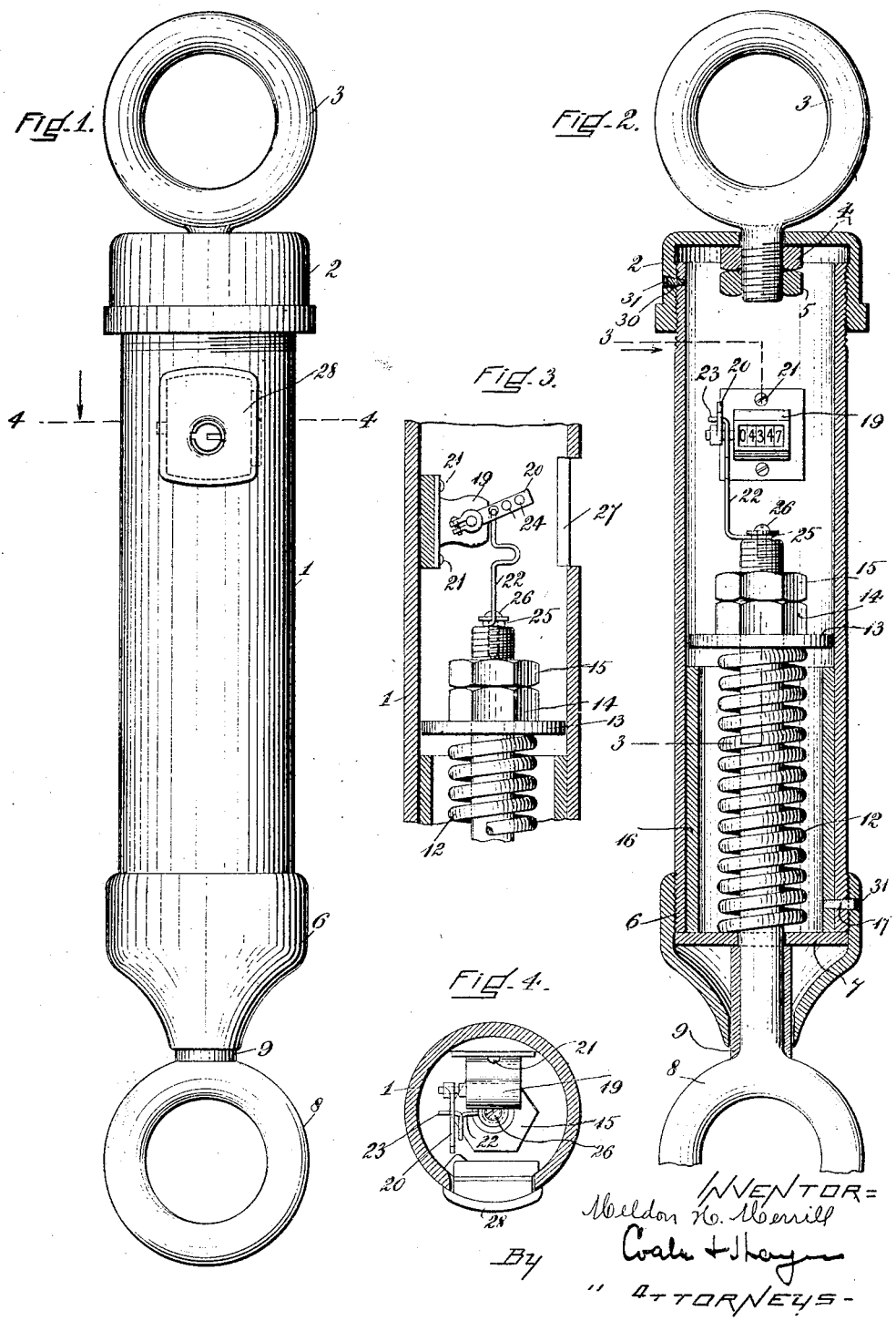

MELDON H. MERRILL, OF BROOKLINE, MASSACHUSETTS.

REGISTERING APPLIANCE.

1,283,854.      Specification of Letters Patent.     Patented Nov. 5, 1918.

Application filed July 2, 1917. Serial No. 178,276.

*To all whom it may concern:*

Be it known that I, MELDON H. MERRILL, of Brookline, in the county of Norfolk and State of Massachusetts, a citizen of the United States, have invented a new and useful Improvement in Registering Appliances, of which the following is a full, clear, and exact description, reference being had to the accompanying drawings, forming a part of this specification, in explaining its nature.

The present invention consists of an appliance for automatically registering or counting and thereby keeping an accurate record of the number of loads or items hoisted or lifted for shifting from one place to another. The appliance is designed to be interposed in any hoisting, winch or crane service.

It is my object to provide a simple, strong and accurate appliance of the above character and one which can be manufactured at a relatively low cost inasmuch as the appliance by design is constructed throughout of standard stock parts.

It is a further object of my invention to make the appliance adjustable so as to be selective as to the weight of the item lifted, that is, to register weights of a certain predetermined amount and leave uncounted other weights or pulls on the appliance.

The appliance embodying my invention can best be seen and understood by reference to the drawings, in which—

Figure 1 shows the appliance in front elevation.

Fig. 2 is a longitudinal vertical section thereof.

Fig. 3 is a section on the line 3—3 of Fig. 2, and

Fig. 4 is a section on the line 4—4 of Fig. 1.

Referring to the drawings:—

1 represents the body of the appliance or casing, preferably made tubular in form. In practice for ordinary usage I make this casing of standard wrought iron pipe of about 2" inside diameter and cut approximately about 6 or 7" long. The ends of the casing are exteriorly threaded, the top end to receive and be covered by an ordinary pipe cap 2 through the center of which a hole of proper size is drilled for the reception of the shank of an eye bolt or load supporting member 3. The shank is retained inside the cap by means of a nut 4 and lock nut 5 thereon. The hole or opening through the cap is made sufficiently large so that the shank of the eye bolt may turn freely therein in order to permit of the appliance turning or twisting as occasion may require when the weight is being lifted.

The bottom end of the pipe or casing is covered by a cap 6 preferably in the nature of a reducing coupling substantially as shown, which is screwed onto the butt end of the casing. Located within the chamber of the coupling and held by it tight against the bottom end of the casing to form a fixture is a plate or washer 7. The reducing coupling 6 and plate 7 are provided with openings through them to receive the shank of an eye bolt 8, which shank projects well up into the interior of the casing. The openings through the coupling and plate 7 are made amply large to permit of the shank of the eye bolt 8 turning freely within them. In fact, the opening through the coupling is made sufficiently large to provide a loose fit for a short pipe section or sleeve 9, which embraces the shank of the eye bolt 8 between the eye thereof and the plate 7. The top end of this sleeve is adapted to have bearing against the plate 7 acting as a stop and the bottom of the sleeve engages the eye of the bolt. The length of this sleeve determines the extent of upward movement of the eye bolt 8 in relation to the casing and is such that the eye of the bolt will reach the limit of its upward travel when just below the bottom end of the coupling.

Surrounding the shank of the eye bolt 8 in that portion thereof which lies within the casing above the plate 7 is a coiled spring 12. This spring is interposed between the plate 7 and a washer 13 arranged upon the shank of the bolt and backed by a nut 14 and lock nut 15 likewise arranged upon the same shank, which at the top end thereof is made threaded to receive the nuts. By means of the adjustment of the nuts 14 and 15 a varying tension may be placed upon the spring with the resulting effect that the eye bolt 8 can only be withdrawn or moved outwardly in relation to the casing by a pull which will overcome the tension of the spring. Accordingly the tension of the spring may be so adjusted that the eye bolt 8 can be withdrawn from its retracted position only by a predetermined weight.

The washer 13 extends laterally from the shank of the bolt or load-supporting member to bear against the inside of the casing which thereby through interposition of the washer, acts to center the shank within the casing and prevent lateral displacement of it during the movement of the load-supporting member in relation to the casing.

The extent of outward movement of the eye bolt in relation to the casing is determined by means of a tubular member or pipe 16 arranged upon the interior of the casing and resting at its bottom end upon the plate 7. The top end of this pipe is spaced from the washer 13 when the eye bolt is occupying a retracted position and provides a stop with which the washer has engagement when the eye bolt is moved outwardly, defining the extent of such movement. The interior pipe 16 is held in place by means of a set screw 17 passed through the butt end of the casing.

Located within the casing 1 just above the top end of the shank of the movable eye bolt 8 is a suitable counter 19 having an operating lever arm 20 the rocking of which causes the counter to register one unit for each downward movement of the arm. The counter is carried by a suitable support secured to the casing by internal screws 21. The operating lever of the counter is actuated through a linkage 22 interposed between the lever and the top end of the shank of the eye bolt 8. The linkage 22 consists of a bent wire the top end 23 of which is turned outwardly to fit within one of a series of openings 24 in the operating arm of the counter. The lower end of the link or wire is bent inwardly and provided with a loop 25 which is secured to the top end of the shank of the eye bolt by means of a stud 26 passed through the loop and fastening into the shank of the bolt. The loop 25 loosely engages the stud, the connection, in other words, of the linkage between the counter and the top end of the bolt being of such nature that the bolt may freely rotate without interfering with the operation of the counter.

According to the use and operation of the appliance, it is first interposed in some part of a hoisting mechanism and the eye bolt 8 or load-supporting member is moved outwardly by the weight of the load or unit lifted and in an amount equal to the space which separates the washer 13 from the top end of the pipe 16 acting as a stop. The downward movement of the bolt through the interposed linkage and operating lever of the counter causes it to register one unit for such movement. As soon as the weight is relieved from the eye bolt 8 it assumes its normal retracted position by means of the spring, which retracted position is defined as above described by the engagement of the top end of the sleeve 9 with the plate 7.

The travel of the eye bolt 8 or load-supporting member will, according to the above arrangement, vary slightly depending upon the adjusted position of the washer 13 for changing the tension of the spring. In order that the counter may be uniformly actuated irrespective of the extent of movement of the load-supporting member, the operating arm of the counter is provided with a number of openings 24, as before pointed out, which lie at varying distances from the fulcrum of the lever and into any one of which openings the linkage 22 fastens dependent upon the movement of the eye bolt 8 or load-supporting member, that one of course being selected by which the resulting movement of the operating arm of the counter will remain substantially the same, whatever the movement of the load-supporting member may be. In order that the linkage 22 may be adaptable as to form or length in obtaining the adjustment, it is preferably provided with a bend in it as shown.

As above explained, the counter is located within the casing. In order to provide for the concealment of the counter and yet have ready access to it for observing it, the casing is provided with an opening or window 27 in it in that portion thereof directly opposite the face of the counter. This opening is closed by a removable cover 28 containing a spring lock, which renders the appliance secure from reading except by unlocking and removing the cover, thus securing the counter from observation.

The construction of the appliance is, also, such that its interior mechanism may be easily sealed to prevent tampering with it by unauthorized persons. Apart from the cover 28, access can be had to the interior of the appliance only by removing the end caps 2 or 6. The top cap is locked onto the casing by means of a pin or screw 30 passing through the cap and into the casing. The head of this screw is countersunk and the space left is filled with wax 31 suitably impressed to prevent removal of the wax without indication of its removal. The bottom cap 6 is sealed in the same way, the pin or screw 17, which holds the pipe 16 in place, serving also to lock the cap 6 onto the casing, and the head of this pin being countersunk, the space left is filled with wax 31 suitably impressed the same as is the pin 30.

Having thus fully described my invention, I claim and desire to secure by Letters Patent of the United States:—

1. In an appliance of the character specified, the combination comprising a tubular casing, a load-supporting member carried by said casing and having a limited in-and-out movement in relation to it, said member having a shank extending inside the casing, a fixture at the lower end of the casing through which said shank extends, a spring inside said casing coiled about said shank and the lower end of which spring has bearing against said fixture, a washer arranged upon said shank to bear against the upper end of said spring and extending also laterally from said shank to bear against the inside of the casing, a nut arranged upon said shank and backing said washer, a stop-forming member inside said casing with which said washer has engagement as said load-supporting member is moved outwardly in relation to said casing, a counter arranged within the casing, and means whereby said counter may be actuated automatically by means of the load-supporting member in relation to the casing.

2. In an appliance of the character specified, the combination comprising a tubular casing with caps at the top and bottom ends thereof, a stop-forming fixture inside the cap at the bottom end of the casing, a load-supporting member carried by said casing and having a limited in-and-out movement in relation to it, said member having a shank extending inside said casing through the cap and fixture at the lower end thereof, a member arranged upon said shank below said fixture and having engagement with said stop-forming fixture when said load-supporting member is occupying an inwardly-moved position with relation to said casing, a spring inside said casing coiled about said shank and with the lower end thereof bearing against said fixture, a washer arranged upon said shank to bear against the upper end of said spring and extending also laterally from said shank to bear against the inside of the casing, a nut arranged upon said shank and backing said washer, a stop-forming member inside said casing with which said washer has engagement as said load-supporting member is moved outwardly in relation to said casing, a counter arranged within the casing, and means whereby said counter may be actuated automatically by means of the load-supporting member in relation to the casing.

3. In an appliance of the character specified, the combination comprising a tubular casing, a load-supporting member carried by said casing and having a limited in-and-out movement in relation to it, said member having a shank extending inside the casing, a fixture at the lower end of the casing through which said shank extends, a spring inside said casing coiled about said shank and the lower end of which spring has bearing against said fixture, a washer arranged upon said shank to bear against the upper end of said spring and extending also laterally from said shank to bear against the inside of the casing, a nut arranged upon said shank and backing said washer, a tubular stop-forming member arranged inside said casing and with the top end of which member said washer has engagement as said load-supporting member is moved outwardly in relation to the casing for limiting such movement, a counter arranged within the casing, and means whereby the counter may be actuated automatically by movement of the load-supporting member in relation to the casing.

4. In an appliance of the character specified, the combination comprising a tubular casing, a load-supporting member carried by said casing and retained to have both a rotary and an in-and-out movement in relation to it, said member having a shank extending inside the casing, a fixture at the lower end of the casing through which said shank extends, means whereby said fixture may limit the inward movement of said load-supporting member in relation to the casing, a spring inside said casing coiled about said shank and the lower end of which spring has bearing against said fixture, a washer arranged upon said shank to bear against the upper end of the spring and extending also laterally from said shank to bear against the inside of the casing, a nut adjustable upon said shank and backing said washer, a tubular stop-forming member arranged inside said casing below said washer and with the top end of which stop-forming member said washer has engagement as said load-supporting member is moved outwardly in relation to the casing for limiting such movement, a counter arranged inside the casing, and means whereby the counter may be actuated automatically by movement of said load-supporting member irrespective of the turned position thereof.

MELDON H. MERRILL.